United States Patent
Dobaczewski et al.

(10) Patent No.: US 12,361,117 B2
(45) Date of Patent: Jul. 15, 2025

(54) SYSTEM AND METHOD FOR INHIBITING DEBUGGER IN NON-SECURE REGION

(71) Applicant: Cypress Semiconductor Corporation, San Jose, CA (US)

(72) Inventors: Jacek Dobaczewski, San Jose, CA (US); Yun-Lu Chen, Hsinchu (TW)

(73) Assignee: CYPRESS SEMICONDUCTOR CORPORATION, San Jose, CA (US)

( * ) Notice: Subject to any disclaimer, the term of this patent is extended or adjusted under 35 U.S.C. 154(b) by 362 days.

(21) Appl. No.: 17/892,650

(22) Filed: Aug. 22, 2022

(65) Prior Publication Data

US 2023/0244779 A1   Aug. 3, 2023

Related U.S. Application Data

(60) Provisional application No. 63/304,375, filed on Jan. 28, 2022.

(51) Int. Cl.
*G06F 21/53* (2013.01)
*G06F 11/3668* (2025.01)

(52) U.S. Cl.
CPC .......... *G06F 21/53* (2013.01); *G06F 11/3696* (2013.01); *G06F 2221/033* (2013.01)

(58) Field of Classification Search
CPC . G06F 21/53; G06F 11/3696; G06F 2221/033
USPC ......................................................... 726/22
See application file for complete search history.

(56) References Cited

U.S. PATENT DOCUMENTS

| | | | |
|---|---|---|---|
| 2014/0201395 A1* | 7/2014 | Lu | G06F 21/44 710/10 |
| 2014/0245266 A1* | 8/2014 | Sun | G06F 11/3664 717/124 |

\* cited by examiner

*Primary Examiner* — Anthony D Brown
(74) *Attorney, Agent, or Firm* — Cooper Legal Group LLC

(57) ABSTRACT

One or more computing devices, systems, and/or methods are provided. In an example, a method comprises storing an application image comprising a non-secure portion in a memory. A first debug request comprising a first target address is received. Halting of a processor is inhibited responsive to the first target address being within a protected region for a portion of non-secure code.

20 Claims, 8 Drawing Sheets

| STIMULUS | !ALLOW_HALT | ALLOW_HALT | HALTED | GET_HALT_ADR | GET_HALT_CMD | DBG_HRDY | DBGRE STARTED | CLN_HRDY | NEXT STATE |
|---|---|---|---|---|---|---|---|---|---|
| CURRENT STATE | ACTION | | | | NEXT STATE | | | | |
| IDLE 302 | RUNNING IN NONPROTECTED REGION | | IDLE | | | | | | NEED PROT |
| NEED PROT 304 | RUNNING IN PROTECTED REGION | | IDLE | | | | | | NEED PROT |
| HALT CHK 306 | CHECK FOR HALT/STEP COMMAND | | | HALT CHK | | | | | HALT CHK |
| RESTART 308 | STOP HALTING BY DBGRESTART | | | RESTART | | | RESTART | | CLN ADDR |
| CLN ADDR 310 | CLEAR C HALT AND C STEP | | | | CLN ADDR | NEED PROT | | | CLN ADDR |
| CLN DATA 312 | | | | | | | | CLN DATA | CLN DATA |
| HALT PEND 314 | PENDING HALT COMMAND | | DBG REQ | | | | | HALT PEND | HALT PEND |
| EXIT HALT 316 | STOP HALTING BY DBGRESTART | | EXIT HALT | | | | EXIT HALT | | HALT PEND |
| DBG_REQ 320 | HALT PROCESSOR BY EDBGRQ | HALT PEND | IDLE | | | | | | DBG REQ |

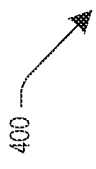

Fig. 4

SYSTEM AND METHOD FOR INHIBITING DEBUGGER IN NON-SECURE REGION

RELATED APPLICATION

This application claims priority to U.S. Provisional Application Ser. No. 63/304,375, titled "ENHANCEMENT TO DEBUGGING PROTECTION IN ARM-V8M TRUST ZONE ARCHITECTURE" and filed on Jan. 28, 2022, which is incorporated herein by reference.

BACKGROUND

Some processors execute an application image that is stored in system memory. Portions of the application image may be designated as secure code or non-secure code. In some instances portions of the application image are created by different entities, such as chip developers, system developers, and customers. A debugger is a tool that allows the application image to be halted to allow instruction viewing, variable viewing, or variable modification. It is challenging to inhibit debugging for non-secure portions of the application image developed by different entities.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, an apparatus is provided. The apparatus comprises a protection unit configured to receive a first debug request comprising a first target address targeting an application image and assert a restart signal on a port of a processor responsive to the first target address being within a protected region for a portion of non-secure code in the application image.

In an embodiment of the techniques presented herein, an apparatus for controlling debugging operations is provided. The apparatus comprises means for storing an application image comprising a non-secure portion in a memory, means for receiving a first debug request comprising a first target address, and means for inhibiting halting of a processor responsive to the first target address being within a protected region for a portion of non-secure code.

In an embodiment of the techniques presented herein, a method for controlling debugging operations is provided. The method comprises storing an application image comprising a non-secure portion in a memory, receiving a first debug request comprising a first target address, and inhibiting halting of a processor responsive to the first target address being within a protected region for a portion of non-secure code.

In an embodiment of the techniques presented herein, a system is provided. The system comprises a memory configured to store an application image comprising a non-secure portion, a debug bus, a processor bus, a protection unit connected between the debug bus and the processor bus and configured to receive, at the debug bus, a first debug request comprising a first target address targeting the non-secure portion of the application image, and inhibit halting of a processor responsive to the first target address being within a protected region of the non-secure portion of the application image.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 4 is a diagram of a state transition table for the finite state machine, in accordance with some embodiments.

DETAILED DESCRIPTION

Figure 1:
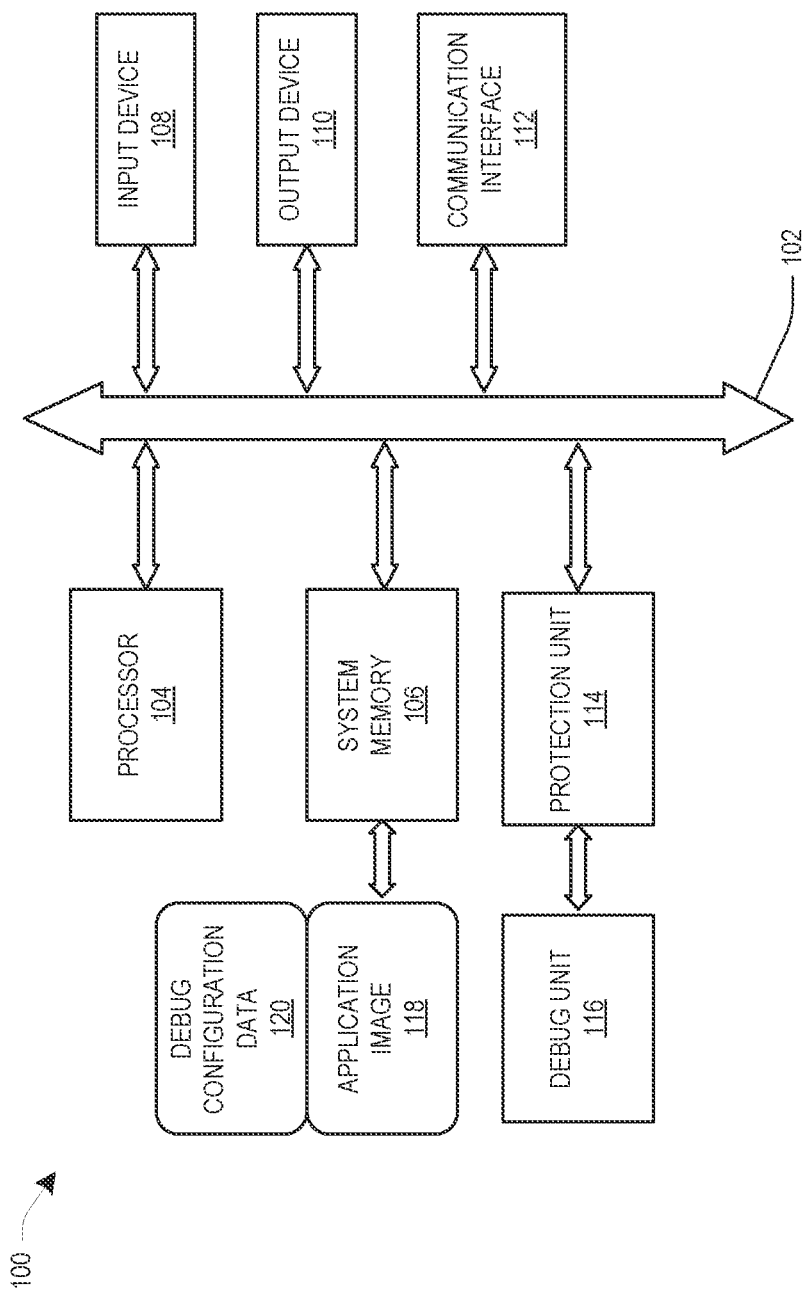
FIG. 1 is a diagram of a processing unit, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

According to some embodiments, an application image is provided for execution by a processor. The application image may comprise a secure code portion and a non-secure code portion. Different entities may be involved with the creation of the application image. For example, a chip developer or a system developer may create some portions of the application image, while a user or customer may develop other portions of the application image. In some embodiments, a protected region of the non-secure code is designated, such as a portion of the non-secure code not developed by the user. Halting of the processor for debugging in the protected region is inhibited to prevent a user from accessing the developer portions of the application image. In some embodiments, a protection unit it is provided on a debug interface between a debug unit and the processor. The protection unit monitors debug bus traffic and identifies debug operations that target the protected region. In response to a halt command that specifies a target address within the protected region, the protection unit inhibits halting by asserting a debug restart signal. Asserting the debug restart signal causes the processor to execute the code within the protected region without halting until the end of the protected region is encountered, after which the processor is allowed to halt. For debug data operations that target the protected region, data (or instructions) that are read is masked and write operations are inhibited. Preventing halting and data operations in the protected region allows debugging operations to be completed for the user-created code sections without compromising the developer-created code sections.

FIG. 1 is a diagram of a computing system 100, in accordance with some embodiments. In some embodiments, the computing system 100 comprises a bus 102, a processor 104, a system memory 106, an input device 108, an output device 110, a communication interface 112, a protection unit 114, and a debug unit 116. The computing system 100 may include fewer components, additional components, different components, and/or a different arrangement of components than those illustrated in FIG. 1.

According to some embodiments, the debug unit 116 is connected to the protection unit 114. Although the protection unit 114 is illustrated as being between the debug unit 116 and the bus 102, the protection unit 114 only monitors and controls selected portions of the bus 102 related to debugging. The bus 102 includes paths that permit communication among the components of the computing system 100. For example, the bus 102 may include a system bus, an address bus, a data bus, a debug bus, and/or a control bus. The bus 102 may also include bus drivers, bus arbiters, bus interfaces, and so forth. The processor 104 and/or the debug unit 116 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. The processor 104 and/or the debug unit 116 may be implemented as hardware (e.g., a microprocessor, etc.), a combination of hardware and software (e.g., a SoC, an ASIC, etc.), may include one or multiple memories (e.g., cache, etc.), etc.

In some embodiments, the system memory 106 includes one or multiple memories and/or one or multiple other types of storage mediums. For example, the system memory 106 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other suitable type of memory. The system memory 106 may include a hard disk, a magnetic disk, an optical disk, a magneto-optic disk, a solid state disk, a Micro-Electromechanical System (MEMS)-based storage medium, a nanotechnology-based storage medium, and/or some other suitable disk. The system memory 106 may include drives for reading from and writing to the storage medium. The system memory 106 may be external to and/or removable from the computing system 100, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). The system memory 106 may store data, software, and/or instructions related to the operation of the computing system 100.

The system memory 106 stores an application image 118, such as a firmware image, that the processor 104 executes during operation of the computing system 100. In some embodiments, the application image 118 is stored in a non-volatile portion of the system memory 106 that retains its data even if power is removed.

In some embodiments, the processor 104 controls the overall operation or a portion of the operation(s) of the computing system 100 by executing the application image 118. The processor 104 performs one or multiple operations based on an operating system and/or various applications or computer programs (e.g., software).

In some embodiments, the input device 108 permits an input into the computing system 100. For example, the input device 108 may comprise a keyboard, a mouse, a display, a touchscreen, a touchless screen, a button, a switch, an input port, speech recognition logic, and/or some other type of suitable visual, auditory, or tactile input component. The output device 110 permits an output from the computing system 100. For example, the output device 110 may include a speaker, a display, a touchscreen, a touchless screen, a projected display, a light, an output port, and/or some other type of suitable visual, auditory, or tactile output component.

The communication interface 112 permits the computing system 100 to communicate with other devices, networks, systems, sensors, and/or the like on a network. The communication interface 112 may include one or multiple wireless interfaces and/or wired interfaces. For example, the communication interface 112 may include one or multiple transmitters and receivers, or transceivers. The communication interface 112 may operate according to a protocol stack and a communication standard. In some embodiments, the communication interface 112 includes an antenna. The communication interface 112 may include various processing logic or circuitry (e.g., multiplexing/de-multiplexing, filtering, amplifying, converting, error correction, etc.). In some embodiments, the communication interface 112 operates using a long range wireless protocol, such as a cellular protocol or a WiFi protocol, a short range protocol, such as BLUETOOTH™, or a wired protocol, such as Ethernet.

The debug unit 116 interfaces with the processor 104 to allow debugging of the application image 118. Debug configuration data 120 defines one or more protected regions of the application image 118 by specifying address ranges for the application image 118. In some embodiments, the debug configuration data 120 is stored in a secure region of the system memory 106 or in hardware registers, such as during an initialization or boot process, to prevent alteration. The protection unit 114 accesses the debug configuration data 120 to identify the protected regions of the application image 118 and controls the debugging operations to prevent debugging of the protected regions.

Figure 2:
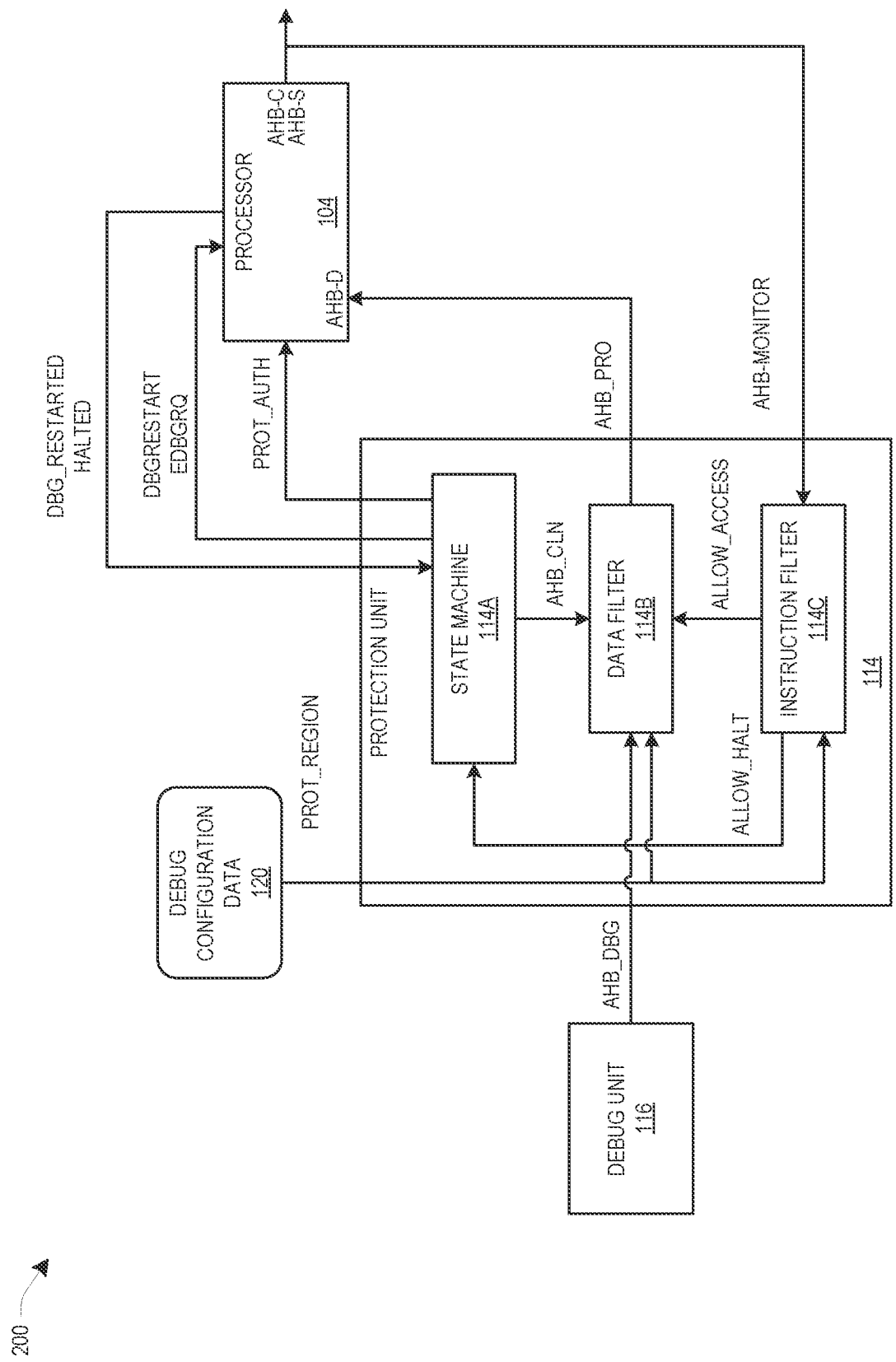
FIG. 2 is a diagram illustrating an interface between a processor, a protection unit, and a debug unit, in accordance with some embodiments.

FIG. 2 illustrates a debugging interface 200 between the processor 104, the protection unit 114, and the debug unit 116, in accordance with some embodiments. The protection unit 114 comprises a state machine 114A, a data filter 114B, and an instruction filter 114C. The debug unit 116 uses a debug bus, such as an Advanced Microcontroller Bus Architecture High Performance Bus (AHB), to send debug commands to the processor 104. The protection unit 114 is between the debug unit 116 side of the AHB bus, AHB_DBG, and the processor 104 side of the AHB bus, AHB_PRO. The processor 104 comprises an AHB-D bus for receiving debug commands and data and AHB-C and AHB-S buses for outputting data and instructions requested through debug commands.

The protection unit 114 monitors the AHB-D bus to identify debugger commands and data and monitors the AHB-C and AHB-S buses to identify for instructions and data produced by processor 104. The protection unit 114 prevents the loading of code or data from the protected region to the debugger buses, AHB-C or AHB-S, or the setting of software breakpoints in the protected region by disabling protection authorization signals when the address on the bus AHB-D is in the protected region defined in the debug configuration data 120. In some embodiments, the protection unit 114 prevents loading of protected data or code to internal registers of the processor 104. In some embodiments, the protection unit 114 prevents the debug unit 116 from halting the processor by modifying data on AHB-D bus the address range is within the protected region.

In some embodiments, the protection unit 114 asserts a restart signal, DBGRESTART, on a port of the processor 104 to inhibit halting of the processor 104 and asserts a halt signal, EDBGRQ on a port of the processor, to halt the processor 104. In some embodiments, the protection unit 114 provides authorization signals, PROT_AUTH, on a port of the processor 104. The protection unit 114 may pass the original PROT_AUTH signals set in the system 100 or the protection unit 114 may modify the PROT_AUTH signals.

The state machine 114A in the protection unit 114 can use the following signals for controlling the interface between the debug unit 116 and the processor 104:

ALLOW_HALT—signal generated by the protection unit 114 indicating that the application image 118 is not in the protected region (inverse of HIT_PR);

HALTED—state variable of the processor 104 indicating that the processor 104 is in the halted state;

GET_HALT_ADDR—signal generated by the protection unit 114 indicating that the debug unit 116 is sending a command to debug halting control and status register (DHCSR)

GET_HALT_CMD—signal generated by the protection unit 114 indicating that the debug unit 116 is sending a halt or step command to the processor 104;

DBG_HRDY—signal of the AHB_DBG indicating that command is complete;

DBG_RESTARTED—state variable of the processor 104 indicating that the processor 104 is restarted;

CLN_HRDY—signal of the AHB_CLN, indicating that command is complete; and

PROT_AUTH—processor 104 protection signals.

In some embodiments, the processor 104 comprises an ARM® processor that employs four protection authorization signals for external debug authentication: DBGEN, NIDEN, SPIDEN, and SPNIDEN. The DBGEN and NIDEN signals specify whether non-secure invasive debug or non-secure non-invasive debug are authorized, and the SPIDEN and SPNIDEN signals specify whether secure invasive debug and secure non-invasive debug are allowed. The protection authorization signals may be represented using four bits PROT_AUTH[3:0]. The PROT_AUTH signals may be stored in a hardware register or a protected region of the system memory 106.

Figure 3:
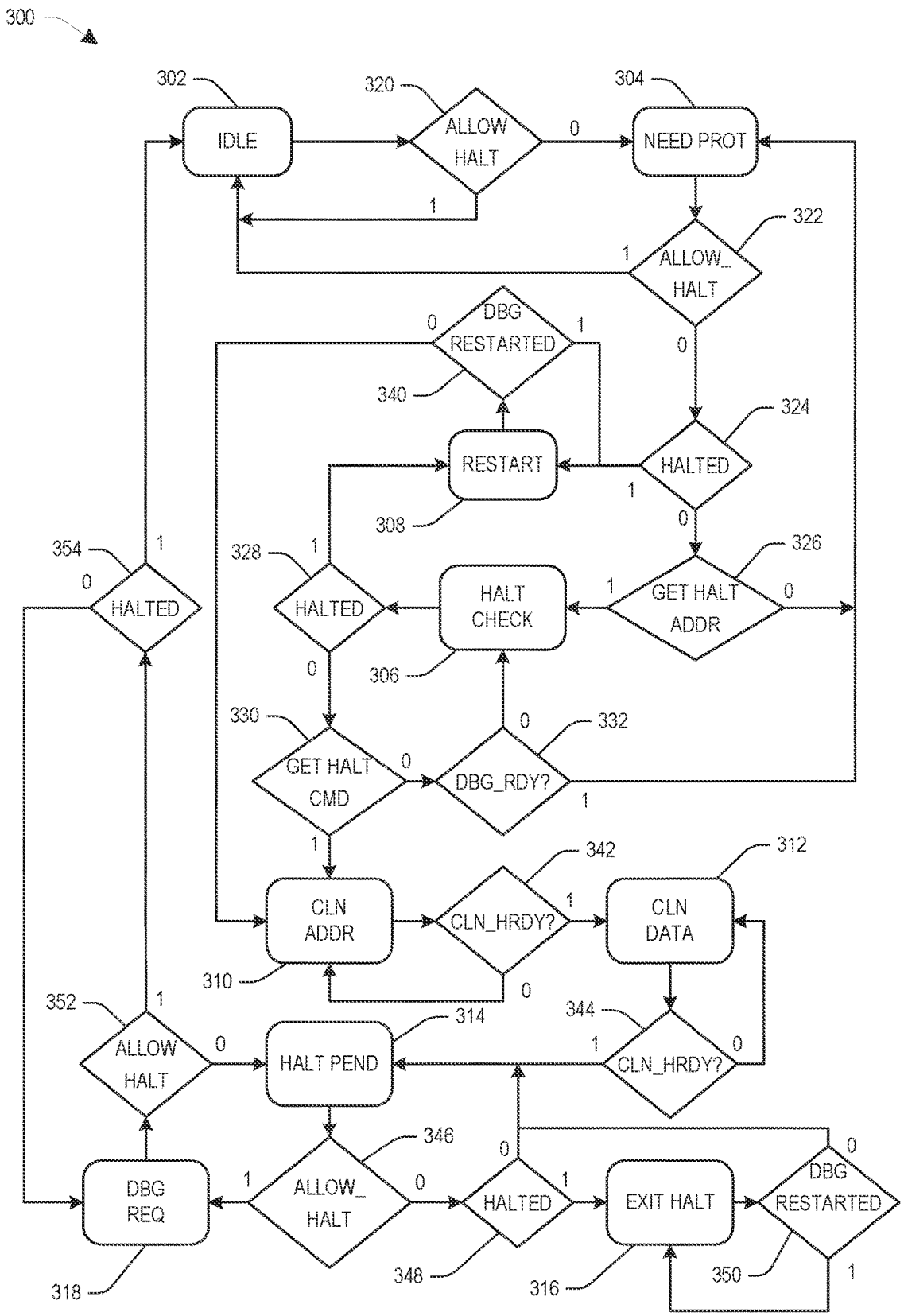
FIG. 3 is a diagram of a state machine, in accordance with some embodiments.

FIG. 3 is a state diagram 300 of the state machine 114A in the protection unit 114, in accordance with some embodiments. FIG. 4 is a state transition table 400 illustrating the operation of the state machine 114A, in accordance with some embodiments. The state machine 114A comprises an idle state (IDLE) 302, a need protection state (NEED_PROT) 304, a halt check state (HALT CHECK) 306, a restart state (RESTART) 308, a clean address state (CLN ADDR) 310, a clean data state (CLN DATA) 312, a halt pending state (HALT PEND) 314, an exit halt state (EXIT HALT) 316, and a debug request state DEB REQ) 318. The state transition table 400 in FIG. 4 lists the states in the state machine 114A and the default next state if no excitation signal is received. If an excitation signal is asserted, the associated state transition is shown.

The state machine 114A is in the IDLE state 302 when the application image 118 is executing in a non-protected region. While in the IDLE state 302, if ALLOW_HALT is asserted at 320, the state machine 114A stays in the IDLE state 302. If ALLOW_HALT is not asserted at 320, the state machine 114A transitions to the NEED PROT state 304. These transitions are shown in the state diagram 300 and in the state transition table 400 in the row for the IDLE state 302.

In the NEED_PROT state 304, the state machine 114A determines whether a protected region of the application image 118 is being executed. While in the NEED PROT state 304, if ALLOW_HALT is asserted at 322, the state machine 114A returns to the IDLE state 302. If ALLOW_HALT is not asserted at 322, and HALTED is asserted at 324, the state machine 114A transitions to the RESTART state 308. If HALTED is not asserted at 324 and GET_HALT_ADDR is not asserted 326, the state machine 114A remains in to the NEED PROT state 304. If GET_HALT_ADDR is asserted at 324, the state machine 114A transitions to the HALT CHECK state 306. These transitions are shown in the state diagram 300 and in the state transition table 400 in the row for the NEED PROT state 304.

In the HALT CHECK state 306, the state machine 114A determines if the processor 104 is halted by a HALT/STEP command. While in the HALT CHECK state 306, if HALTED is asserted at 328, the state machine 114A transitions to the RESTART state 308. If HALTED is not asserted at 328 and GET_HALT_CMD is asserted at 330, the state machine 114A transitions to the CLN ADDR state 310. If GET_HALT_CMD is not asserted at 330 and DBG_RDY is asserted at 332, the state machine 114A transitions to the NEED PROT state 304. If DBG_RDY is not asserted at 332, the state machine 144 transitions to the HALT CHECK state 306. These transitions are shown in the state diagram 300 and in the state transition table 400 in the row for the HALT CHECK state 306.

In the RESTART state 308, the protection unit 114 stops the halting of the processor 104 by asserting the DBGRESTART signal to prevent debugging in the protected region. While in the RESTART state 308, if DBG_RESTARTED is asserted by the processor 104 at 340, the state machine 114A remains in the RESTART state 308. If DBG_RESTARTED is not asserted at 340, the state machine 114A transitions to the CLN ADDR state 310. These transitions are shown in the state diagram 300 and in the state transition table 400 in the row for the RESTART state 308.

In the CLN ADDR state 310, the protection unit 114 masks address data output by the processor 104. While in the CLN ADDR state 310, if CLN_HRDY is asserted at 342, the state machine 114A transitions to the CLN DATA state 312. If CLN_HRDY is not asserted at 342, the state machine 114A remains in the CLN ADDR state 310. The protection unit 114 clears a C_HALT bit and/or a C_STEP bit in the DHCSR. In the CLN_ADDR state 310, the protection unit 114 injects the DHCSR register address on the AHB_PRO bus and waits for the assertion of CLN_HRDY indicating that the address was accepted. When hardcoded data is injected on the AHB_PRO bus to clear C_HALT and C_STEP, the protection unit 114 waits for the next CLN_HRDY indicating that data is accepted. These transitions are shown in the state diagram 300 and in the state transition table 400 in the row for the CLN ADDR state 310.

In the CLN DATA state 312, the protection unit 114 masks data output by the processor 104. While in the CLN DATA state 312, if CLN_HRDY is asserted at 344, the state machine 114A transitions to the HALT PEND state 314. If CLN_HRDY is not asserted at 344, the state machine 114A remains in the CLN DATA state 312. These transitions are shown in the state diagram 300 and in the state transition table 400 in the row for the CLN DATA state 312.

In the HALT PEND state 314, the state machine 114A identifies whether a halt request is pending for the processor 104. While in the HALT PEND state 314, if ALLOW_HALT is asserted at 346, the state machine 114A transitions to the DBG REQ state 318. If ALLOW_HALT is not asserted at 346, and HALTED is asserted at 348, the state machine 114A transitions to the EXIT HALT state 316. If HALTED is not asserted at 348, the state machine 114A returns to the HALT PEND state 314. These transitions are shown in the state diagram 300 and in the state transition table 400 in the row for the HALT PEND state 314.

In the EXIT HALT state 316, the state machine 114A stops the halting of the processor 104 by asserting the DBGRESTART signal. If DBG_RESTARTED is asserted at 350, the state machine remains in the EXIT HALT state 316. If DBG_RESTARTED is not asserted at 350, the state machine 114A transitions to the HALT PEND state 314. These transitions are shown in the state diagram 300 and in the state transition table 400 in the row for the EXIT HALT state 316.

In the DBG REQ state 318 the state machine 114A halts the processor 104 by asserting the EDBGRQ signal. If ALLOW_HALT is asserted at 352 and HALTED is asserted at 354, the state machine 114A transitions to the IDLE state 302. If HALTED is not asserted at 354, the state machine 114A remains in the DBG REQ state 318. These transitions are shown in the state diagram 300 and in the state transition table 400 in the row for the DBG REQ state 318.

Figure 5:
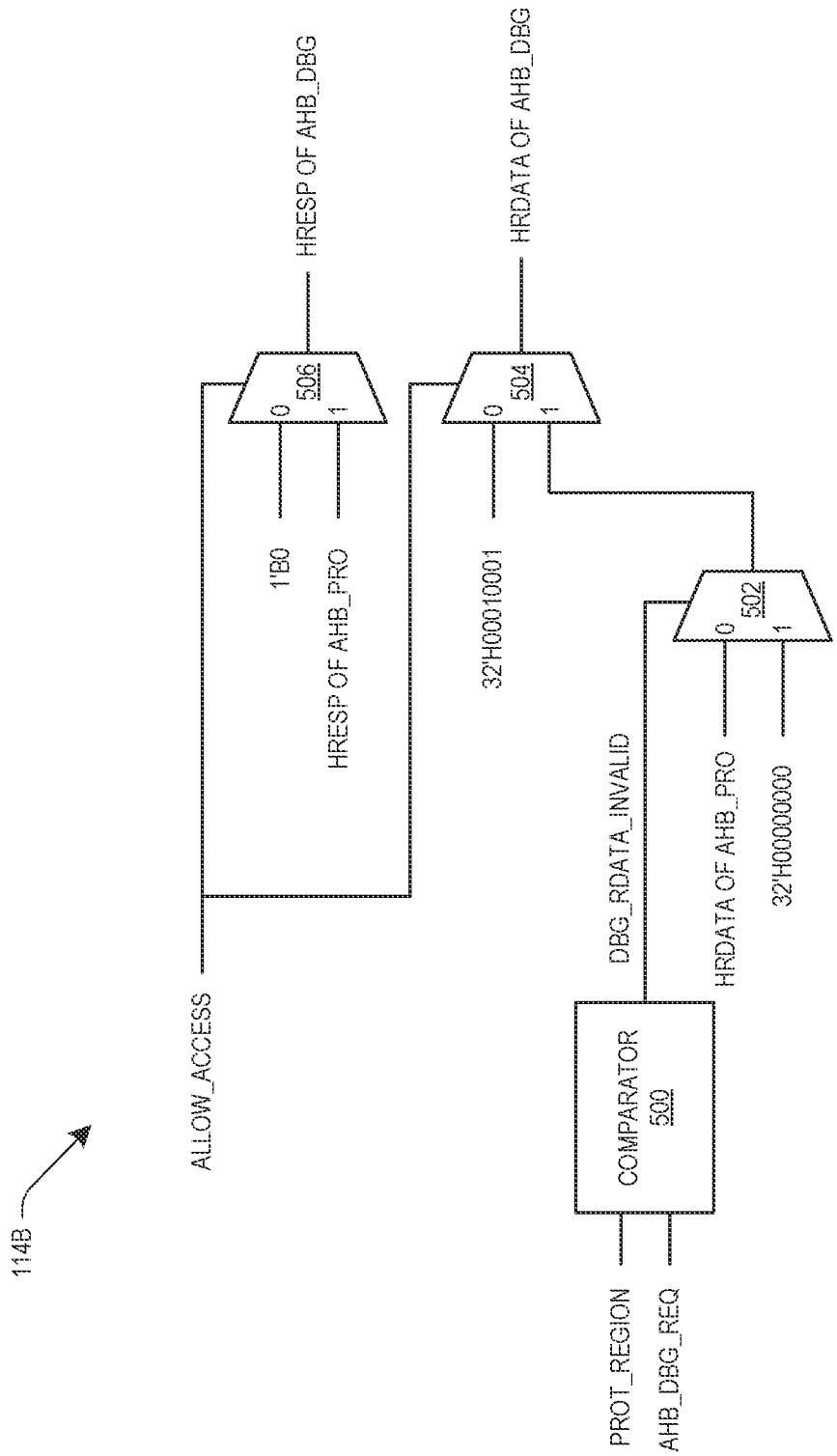
FIG. 5 is a diagram of a data filter, in accordance with some embodiments.

FIG. 5 is a diagram of the data filter 114B in the protection unit 114, in accordance with some embodiments. In some embodiments, the data filter 114B comprises a comparator 500 and multiplexers 502, 504, 506. The comparator 500 compares an address of the request from the debug unit 116, AHB_DBG_REQ on the AHB_DBG bus to the range or ranges of addresses in the protected region, PROT_REGION, and generates a DBG_RDATA_INVALID signal if the request targets the protected region. The multiplexer 502 passes the data generated by the processor 104, HRDATA, on the AHB_PRO bus if the request is valid, and filters the data using filter bits "32'H00000000" if the request is invalid.

The instruction filter 114C generates an ALLOW_ACCESS signal responsive to a code fetch on the AHB C and AHB S buses having an address that is not in the protected region. The ALLOW_ACCESS signal is based on the ALLOW_HALT signal, but ALLOW_ACCESS remains asserted when the state machine 114A is in CLN_ADDR state 310 or the CLN_DATA state 312. The multiplexer 504 passes the data generated by the multiplexer 502 to the AHB_DBG bus if ALLOW_ACCESS is asserted and passes a dummy value, "32'H00010001" if ALLOW_ACCESS is not asserted to avoid a timeout. The multiplexer 506 passes the HRESP signal of the processor 104 on the AHB_PRO bus to the AHB_DBG bus if ALLOW_ACCESS is asserted and filters the HRESP using a filter bit "1'B0" if ALLOW_ACCESS is not asserted. Filtering the data generated by the processor 104 prevents the debug unit 116 from accessing data in the protected region.

Figure 6:
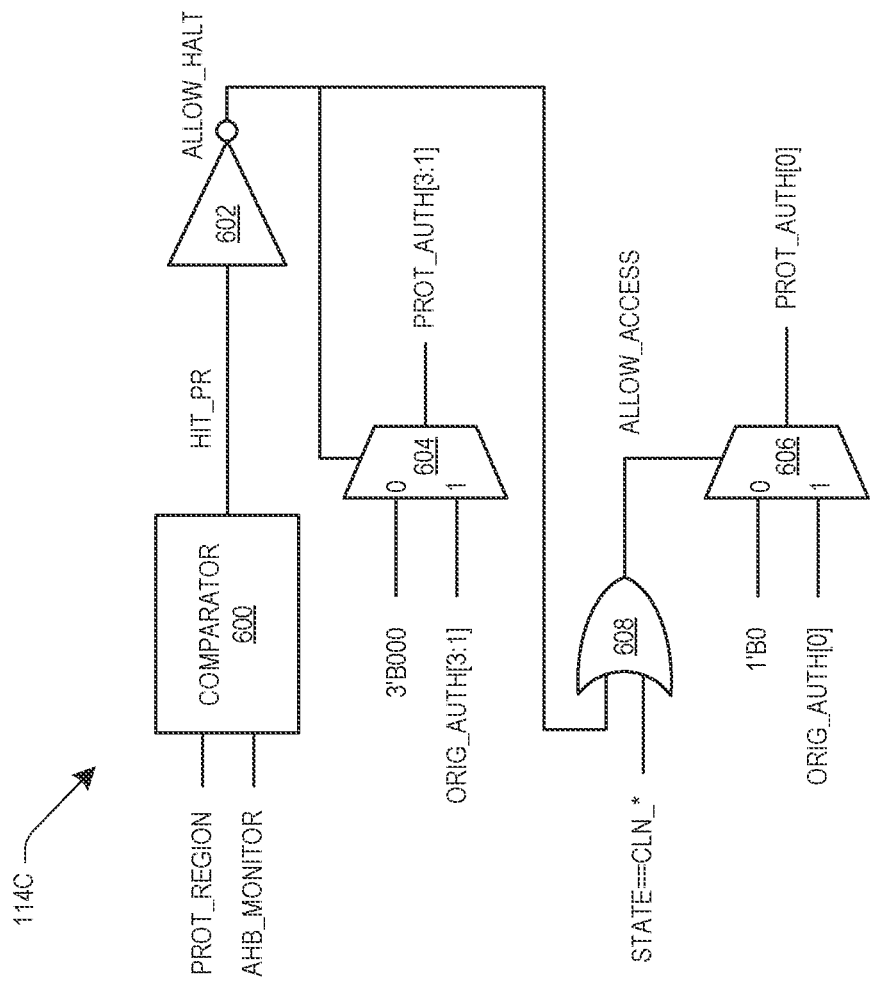
FIG. 6 is a diagram of an instruction filter, in accordance with some embodiments.

FIG. 6 is a diagram of the instruction filter 114C in the protection unit 114, in accordance with some embodiments. The comparator 600 compares an address, AHB_MONITOR, on the AHB_DBG bus to the range or ranges of addresses in the protected region, PROT_REGION, and generates a HIT_PR signal if AHB_MONITOR is in the protected region. In some embodiments, the comparator 600 conducts multiple comparisons if there are multiple protection regions. The inverter 602 generates an ALLOW_HALT signal which is an inverse of the HIT_PR signal. The ALLOW_HALT signal is asserted when halting of the processor 104 is allowed, since AHB_MONITOR is not in the protected region.

The multiplexer 604 generates the PROT_AUTH[3:1] bits for the processor 104 based on the original protection authorization signals, ORIG_AUTH[3:1]. If ALLOW_HALT is not asserted, the multiplexer 604 filters the ORIG_AUTH[3:1] bits, for example, using filter bits "3B'000". If ALLOW_HALT is asserted, the multiplexer 604 passes the ORIG_AUTH[3:1] bits.

The logic gate 608 controls the multiplexer 606 based on the ALLOW_HALT signal and a STATE==CLN_* signal indicating that the protection unit 114 is in the CLN ADDR state 310 or the CLN DATA state 312. The multiplexer 606 generates the PROT_AUTH[0] bits for the processor 104 based on the original protection authorization signal, ORIG_AUTH[0]. If ALLOW_HALT and STATE==CLN_* are not asserted, the multiplexer 606 filters the ORIG_AUTH[0] bit, for example, by setting the bit to "0". If ALLOW_HALT or STATE==CLN_* is asserted, the multiplexer 604 passes the ORIG_AUTH[0] bit. Filtering the protection authorization bits prevents the debug unit 116 from sending commands targeting the protected region.

Figure 7:
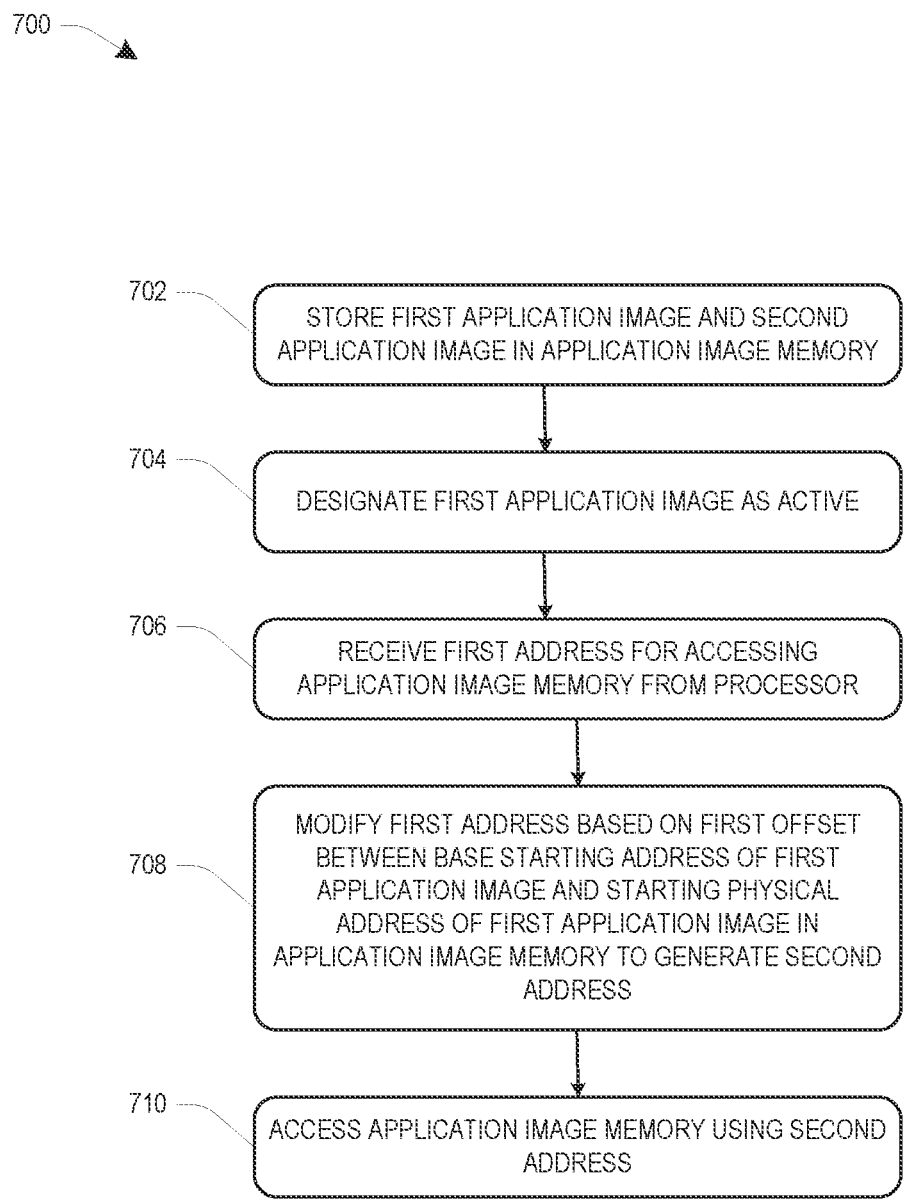
FIG. 7 is flow chart illustrating an example method for controlling debugging operations, in accordance with some embodiments.

FIG. 7 is a flow chart illustrating an example method 700 for controlling debugging operations. At 702, an application image 118 comprising a non-secure portion is stored in a memory 106. At 704, a first debug request comprising a first target address is received. At 706, halting of a processor 104 is inhibited responsive to the first target address being within a protected region for a portion of non-secure code.

Figure 8:
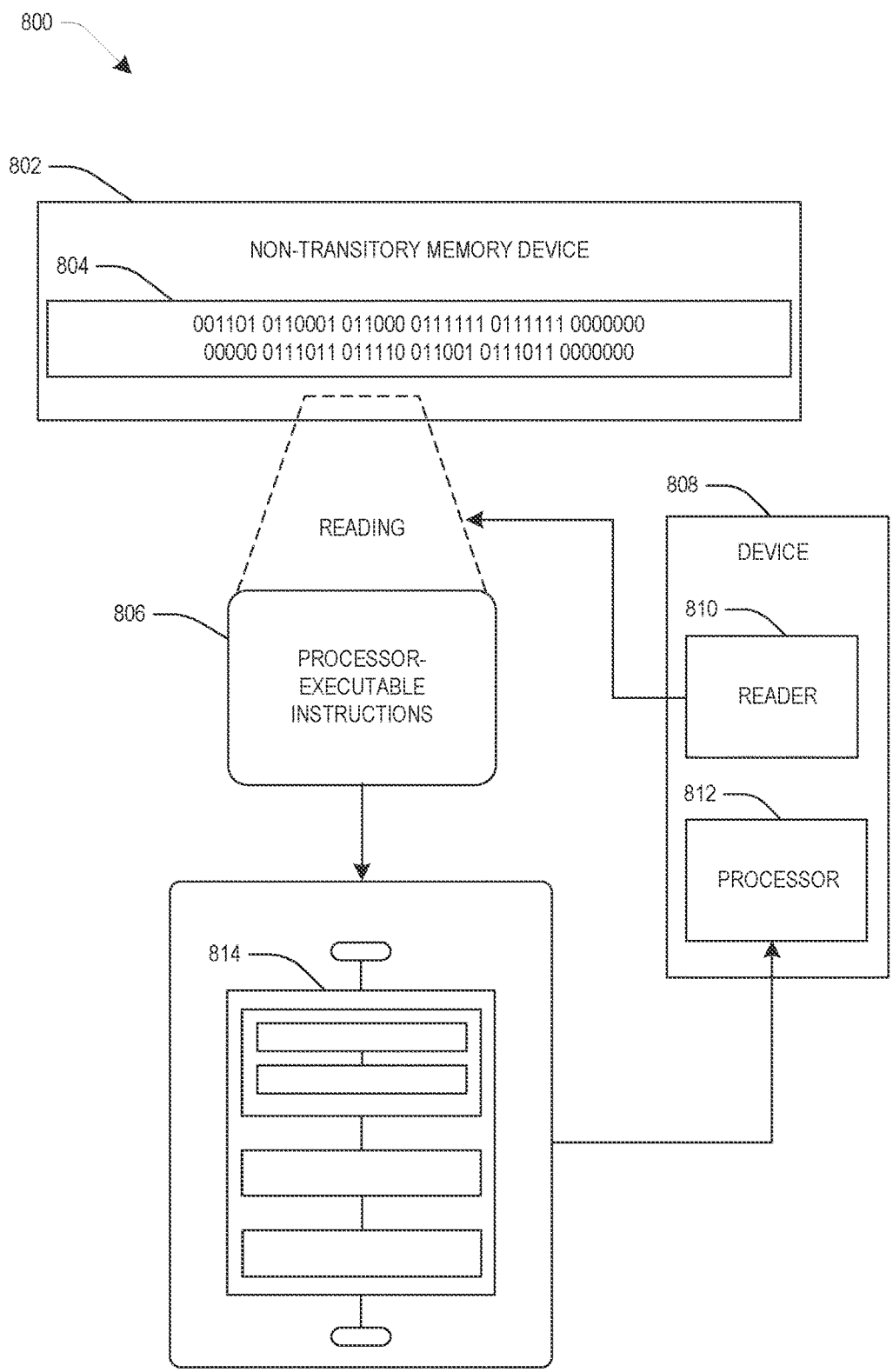
FIG. 8 illustrates an exemplary embodiment of a computer-readable medium, in accordance with some embodiments.

FIG. 8 illustrates an exemplary embodiment 800 of a computer-readable medium 802, in accordance with some embodiments. One or more embodiments involve a computer-readable medium comprising processor-executable instructions configured to implement one or more of the techniques presented herein, such as the method 700. The embodiment 800 comprises a non-transitory computer-readable medium 802 (e.g., a CD-R, DVD-R, flash drive, a platter of a hard disk drive, etc.), on which is encoded computer-readable data 804. This computer-readable data 804 in turn comprises a set of processor-executable computer instructions 806 that, when executed by a computing device 808 including a reader 810 for reading the processor-executable computer instructions 806 and a processor 812 for executing the processor-executable computer instructions 806, are configured to facilitate operations according to one or more of the principles set forth herein. In some embodiments, the processor-executable computer instructions 806, when executed, are configured to facilitate performance of a method 814, such as at least some of the aforementioned method(s). In some embodiments, the processor-executable computer instructions 806, when executed, are configured to facilitate implementation of a system, such as at least some of the one or more aforementioned system(s). Many such computer-readable media may be devised by those of ordinary skill in the art that are configured to operate in accordance with the techniques presented herein.

The term "computer readable media" may include communication media. Communication media typically embodies computer readable instructions or other data in a "modulated data signal" such as a carrier wafer or other transport mechanism and includes any information delivery media. The term "modulated data signal" may include a signal that has one or more of its characteristics set or changed in such a manner as to encode information in the signal.

In an embodiment of the techniques presented herein, an apparatus is provided. The apparatus comprises a protection unit configured to receive a first debug request comprising a first target address targeting an application image and assert a restart signal on a port of a processor responsive to the first target address being within a protected region for a portion of non-secure code in the application image.

In an embodiment of the techniques presented herein, the protection unit is configured to receive a debug data request comprising a second target address and filter data on an output bus of the processor responsive to the second target address being within the protected region.

In an embodiment of the techniques presented herein, the protection unit is configured to filter data on a bus of the processor responsive to the first target address being within the protected region.

In an embodiment of the techniques presented herein, the protection unit is configured to filter a protection authorization signal on a port of the processor responsive to the first target address being within the protected region.

In an embodiment of the techniques presented herein, the protection unit is configured to receive a second debug request comprising a second target address, and assert a halt signal at a port of the processor responsive to the second target address not being within the protected region.

In an embodiment of the techniques presented herein, the protection unit is configured to assert the restart signal while the processor executes code between the first target address and the second target address.

In an embodiment of the techniques presented herein, an apparatus for controlling debugging operations is provided. The apparatus comprises means for storing an application image comprising a non-secure portion in a memory, means for receiving a first debug request comprising a first target address, and means for inhibiting halting of a processor responsive to the first target address being within a protected region for a portion of non-secure code.

In an embodiment of the techniques presented herein, a method for controlling debugging operations is provided. The method comprises storing an application image comprising a non-secure portion in a memory, receiving a first debug request comprising a first target address, and inhibiting halting of a processor responsive to the first target address being within a protected region for a portion of non-secure code.

In an embodiment of the techniques presented herein, the method comprises receiving a debug data request comprising a second target address, and filtering data on an output bus of the processor responsive to the second target address being within the protected region.

In an embodiment of the techniques presented herein, the method comprises filtering data on a bus of the processor responsive to the first target address being within the protected region.

In an embodiment of the techniques presented herein, inhibiting halting of the processor comprises asserting a debug restart signal.

In an embodiment of the techniques presented herein, inhibiting halting of the processor comprises filtering a protection authorization signal.

In an embodiment of the techniques presented herein, the method comprises receiving a second debug request comprising a second target address, and halting the processor responsive to the second target address not being within the protected region.

In an embodiment of the techniques presented herein, the method comprises executing code between the first target address and the second target address while inhibiting the halting the processor.

In an embodiment of the techniques presented herein, a system is provided. The system comprises a memory configured to store an application image comprising a non-secure portion, a debug bus, a processor bus, a protection unit connected between the debug bus and the processor bus and configured to receive, at the debug bus, a first debug request comprising a first target address targeting the non-secure portion of the application image, and inhibit halting of a processor responsive to the first target address being within a protected region of the non-secure portion of the application image.

In an embodiment of the techniques presented herein, the protection unit is configured to assert a restart signal at a port of the processor to inhibit halting of the processor.

In an embodiment of the techniques presented herein, the protection unit is configured to receive, at the debug bus, a debug data request comprising a second target address, and filter data associated with the debug data request on the processor bus responsive to the second target address being within the protected region.

In an embodiment of the techniques presented herein, the protection unit is configured to filter data on the processor bus responsive to the first target address being within the protected region.

In an embodiment of the techniques presented herein, the protection unit is configured to filter a protection authorization signal on a port of the processor responsive to the first target address being within the protected region.

In an embodiment of the techniques presented herein, the protection unit is configured to receive a second debug request comprising a second target address, and assert a halt signal at a port of the processor responsive to the second target address not being within the protected region.

In an embodiment of the techniques presented herein, the protection unit is configured to inhibit the halting of the processor while the processor executes code between the first target address and the second target address.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form. Also, unless specified otherwise, "first," "second," or the like are not intended to imply a temporal aspect, a spatial aspect, an ordering, etc. Rather, such terms are merely used as identifiers, names, etc. for features, elements, items, etc. For example, a first element and a second element generally correspond to element A and element B or two different or two identical elements or the same element.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. An apparatus, comprising:
   a protection unit configured to:
      receive a first debug request comprising a first target address targeting a range of addresses associated with an application image; and
      assert a restart signal on a port of a processor responsive to the first target address being within a protected region of the range of addresses for a portion of non-secure code in the application image.

2. The apparatus of claim 1, wherein:
   the protection unit is configured to:
      receive a debug data request comprising a second target address; and
      filter data on an output bus of the processor responsive to the second target address being within the protected region.

3. The apparatus of claim 1, wherein:
   the protection unit is configured to:
      filter data on a bus of the processor responsive to the first target address being within the protected region.

4. The apparatus of claim 1, wherein:
   the protection unit is configured to:
      filter a protection authorization signal on a port of the processor responsive to the first target address being within the protected region.

5. The apparatus of claim 1, wherein:
   the protection unit is configured to:
      receive a second debug request comprising a second target address; and
      assert a halt signal at a port of the processor responsive to the second target address not being within the protected region.

6. The apparatus of claim 5, wherein:
   the protection unit is configured to:
      assert the restart signal while the processor executes code between the first target address and the second target address.

7. A method for controlling debugging operations, comprising:
   storing an application image comprising a non-secure portion in a memory;
   receiving a first debug request comprising a first target address targeting a range of addresses associated with the application image; and
   inhibiting halting of a processor responsive to the first target address being within a protected region of the range of addresses for a portion of non-secure code.

8. The method of claim 7, comprising:
   receiving a debug data request comprising a second target address; and
   filtering data on an output bus of the processor responsive to the second target address being within the protected region.

9. The method of claim 7, comprising:
   filtering data on a bus of the processor responsive to the first target address being within the protected region.

10. The method of claim 7, wherein inhibiting halting of the processor comprises:
    asserting a debug restart signal.

11. The method of claim 7, wherein inhibiting halting of the processor comprises:
    filtering a protection authorization signal.

12. The method of claim 7, comprising:
    receiving a second debug request comprising a second target address; and
    halting the processor responsive to the second target address not being within the protected region.

13. The method of claim 12, comprising:
    executing code between the first target address and the second target address while inhibiting the halting the processor.

14. A system, comprising:
    a memory configured to store an application image comprising a non-secure portion;
    a debug bus;
    a processor bus;
    a protection unit connected between the debug bus and the processor bus and configured to:
       receive, at the debug bus, a first debug request comprising a first target address targeting a range of addresses associated with the non-secure portion of the application image; and inhibit halting of a processor responsive to the first target address being within a protected region of the range of addresses of the non-secure portion of the application image.

15. The system of claim 14, wherein:
the protection unit is configured to assert a restart signal at a port of the processor to inhibit halting of the processor.

16. The system of claim 14, wherein:
the protection unit is configured to:
   receive, at the debug bus, a debug data request comprising a second target address; and
   filter data associated with the debug data request on the processor bus responsive to the second target address being within the protected region.

17. The system of claim 14, wherein:
the protection unit is configured to:
   filter data on the processor bus responsive to the first target address being within the protected region.

18. The system of claim 14, wherein:
the protection unit is configured to:
   filter a protection authorization signal on a port of the processor responsive to the first target address being within the protected region.

19. The system of claim 14, wherein:
the protection unit is configured to:
   receive a second debug request comprising a second target address; and
   assert a halt signal at a port of the processor responsive to the second target address not being within the protected region.

20. The system of claim 19, wherein:
the protection unit is configured to:
   inhibit the halting of the processor while the processor executes code between the first target address and the second target address.

* * * * *